(12) United States Patent  
Furman

(10) Patent No.: US 7,791,303 B2
(45) Date of Patent: Sep. 7, 2010

(54) ELECTRIC MOTOR CONTROLLER WITH BRUSH POSITION DETECTOR

(75) Inventor: Edward Furman, Mentor, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 744 days.

(21) Appl. No.: 11/566,771

(22) Filed: Dec. 5, 2006

(65) Prior Publication Data

US 2008/0131099 A1 Jun. 5, 2008

(51) Int. Cl.
*H02P 7/00* (2006.01)
(52) U.S. Cl. ............... 318/541; 318/292; 318/400.09; 388/811; 388/809
(58) Field of Classification Search ........ 318/400.09, 318/541, 292; 388/809, 811
See application file for complete search history.

(56) References Cited

U.S. PATENT DOCUMENTS

| | | | |
|---|---|---|---|
| 4,910,790 A | 3/1990 | Kershaw | |
| 5,134,351 A * | 7/1992 | Msihid | ........... 318/541 |
| 5,569,990 A | 10/1996 | Dunfield | |
| 5,712,574 A | 1/1998 | Street | |
| 6,570,350 B2 * | 5/2003 | Ohno et al. | .......... 388/819 |
| 6,628,893 B2 * | 9/2003 | Ohno et al. | .......... 388/800 |
| 6,768,282 B2 * | 7/2004 | Lutter et al. | .......... 318/603 |
| 7,071,643 B2 * | 7/2006 | Prevo et al. | .......... 318/268 |
| 7,161,493 B2 * | 1/2007 | Itou et al. | .......... 340/648 |
| 7,307,368 B2 * | 12/2007 | Tsurukawa et al. | .......... 310/237 |
| 2006/0261763 A1 | 11/2006 | Iott et al. | |

OTHER PUBLICATIONS

International Search Report for PCT/US2007/083723 dated May 16, 2008.

* cited by examiner

*Primary Examiner*—Bentsu Ro
*Assistant Examiner*—David S Luo
(74) *Attorney, Agent, or Firm*—Foley & Lardner LLP

(57) ABSTRACT

Provided are a method, computer-readable medium, and system for automatically determining a proper operational current input to an electric motor. In an exemplary embodiment, a method for determining the proper operational current input includes sending a test signal to an input of an electric motor. A response to the test signal is measured using an output of the electric motor. Based on the measured response, a position of a brush that is capable of conducting current through a commutator of the electric motor is determined. The electric motor is supplied with a first current input if the brush is in a first position and a second current input if the brush is in a second position.

20 Claims, 5 Drawing Sheets

ELECTRIC MOTOR CONTROLLER WITH BRUSH POSITION DETECTOR

FIELD OF THE INVENTION

The subject of the disclosure relates generally to electric brush motors. More specifically, the disclosure relates to a controller for an electric brush motor that automatically detects a conducting brush position.

BACKGROUND OF THE INVENTION

Electric motors, which operate by converting electrical energy into mechanical energy, are used to power many labor-saving devices. A typical electric motor can include an armature, a stator, a commutator, and a plurality of brushes. The plurality of brushes, which can include a first brush and a second brush, can pass current from a power supply to the commutator. In a typical DC motor, the first brush can act as a negative terminal and the second brush can act as a positive terminal (or vice versa) such that current can be conducted through the commutator. The first brush (or common brush) can be a current conducting brush mounted in a stationary position relative to the commutator. The second brush can be a current conducting brush capable of being mounted in a plurality of positions. In an alternative configuration, the second brush can be mounted in a fixed position and there can also be a third brush mounted in a fixed position. In such a configuration, a switching circuit can be used to ensure that only one of the second brush and the third brush is able to conduct current at a given time. Similarly, there can also be a fourth brush, and so on.

In an electric motor with only two brushes, varying the position of the second brush relative to the first brush and/or relative to the commutator can facilitate different optimal electric motor speed and torque ranges or modes. For example, a low speed, high torque operating mode can be facilitated by positioning the second brush such that it is annularly spaced 180 degrees from the first brush. Similarly, higher speed, lower torque operating modes can be facilitated by positioning the second brush such that it is annularly spaced less than 180 degrees from the first brush. In an electric motor with third, fourth, etc. brushes, different operating modes can be facilitated by manipulating a switching circuit to control which of the second, third, fourth, etc. brushes is capable of conducting current at a given time.

To ensure that an electric motor does not break down or overheat, an amount of operational current supplied to the electric motor should correspond to the optimal operating mode dictated by the position of the brushes that are conducting the current. If the brushes are positioned such that the electric motor is in a low speed operational mode, a controller should provide an amount of current required for low speed operation. Supplying a high speed operational current to an electric motor that is set up for low speed operation can cause the electric motor to overheat and/or break down. Likewise, if the position of the brushes dictate that the electric motor is in a high speed operational mode, the controller should provide an amount of current required for high speed operation such that the electric motor operates efficiently and safely.

In general, a user action informs the controller of an optimal operating mode of an electric motor corresponding to a present brush configuration. The user action can include flipping a switch, pressing a button, turning a knob, etc. If the user fails to correctly inform the power supply controller of the current required for optimal operation as dictated by the brush configuration, the electric motor can run inefficiently and/or be damaged. Thus, there is a need for an electric brush motor in which a position of a current conducting brush can be automatically detected without a user action. Further, there is a need for an electric brush motor in which a required operational current can be automatically supplied based on the detected position of the current conducting brush.

SUMMARY

A controller for an electric brush motor is provided that automatically detects a conducting brush position and determines a proper operational current input to the electric brush motor. In an exemplary method, a test signal is sent to an input of an electric motor. A response to the test signal is measured using an output of the electric motor. Based on the measured response, a position of a brush that is capable of conducting current through a commutator of the electric motor is determined. The electric motor is supplied with a first current input if the brush is in a first position and a second current input if the brush is in a second position.

Another exemplary embodiment provides a computer-readable medium having computer-readable instructions stored thereon that, upon execution by a processor, cause the processor to control an input to an electric motor. The instructions include sending a test signal to an input of an electric motor. Based on an output of the electric motor, a response to the test signal is received. Based on the received response, a position of a brush that is capable of conducting current through a commutator of the electric motor is determined. The electric motor is supplied with a first current input if the brush is in a first position and a second current input if the brush is in a second position.

Another exemplary embodiment provides an electric motor system. The electric motor system comprises an electric motor and a controller. The electric motor comprises a commutator, a first brush mounted such that the first brush is capable of conducting current through the commutator, and a second brush mounted such that the second brush is capable of conducting current through the commutator. The controller is configured to send a test signal to the electric motor. A response to the test signal is measured using an output of the electric motor. Based on the measured response, a position of the second brush is determined.

Other principal features and advantages of the exemplary embodiments will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings, wherein like numerals will denote like elements.

DETAILED DESCRIPTION

Figure 1:
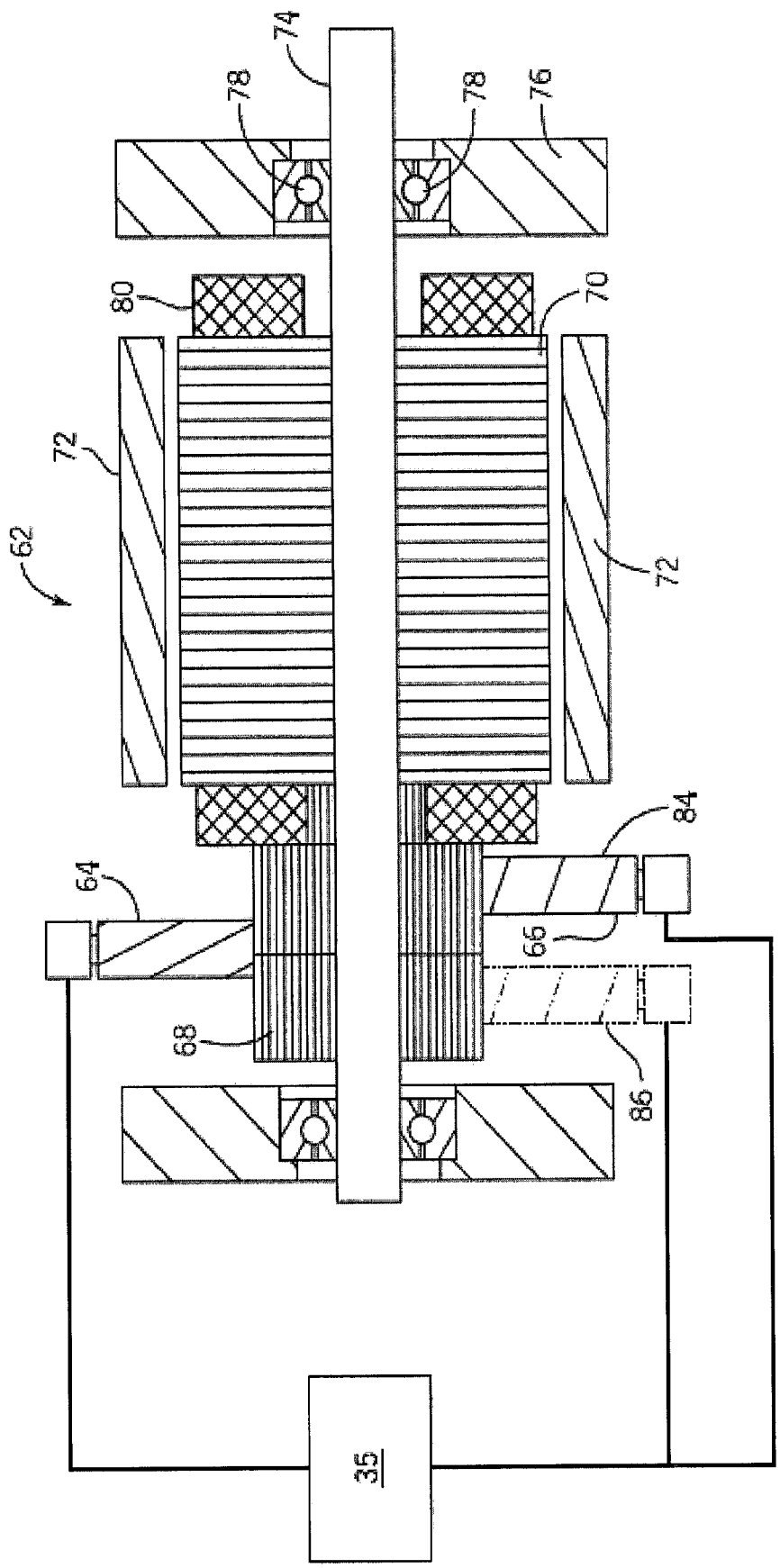
FIG. 1 is a cross-sectional view of an electric motor coupled to a controller in accordance with an exemplary embodiment.

FIG. 1 illustrates an electric motor 62 and a controller 35 according to an exemplary embodiment. The electric motor 62 includes a first brush 64, a second brush 66, a commutator 68, an armature 70, a stator 72, and a shaft 74. The shaft 74, which extends through an enclosing wall 76 of the electric motor 62, is supported by a plurality of bearings 78 to reduce rotational friction. The armature 70 can include a core and a plurality of current conducting coils 80 or windings which surround the core. The armature 70 can be partially or totally surrounded by and rotatably mounted within the stator 72. The stator 72 can include one or more stationary permanent magnets. As operational current from a power supply is applied to the one or more current conducting coils 80 of the armature 70, an electromagnetic force is generated according to the Lorentz force law. The generated electromagnetic force interacts with the force of the magnetic field created by the one or more stationary permanent magnets within the stator 72 and causes the armature 70 to rotate as known to those skilled in the art.

Operational current to the armature 70 can be supplied by the controller 35, which can be in communication with a power supply. The power supply can include a pulse width modulation drive or any other drive capable of operating the electric motor 62 depending on the embodiment. The controller 35 can provide operational current to the commutator 68 via the first brush 64 and the second brush 66. In an exemplary embodiment, the commutator 68 can rotate relative to the first brush 64 and the second brush 66. Alternatively, the first brush and the second brush can rotate relative to the commutator. The supplied operational current can flow through the commutator 68 into the armature 70 to create the electromagnetic force necessary to rotate the armature 70.

In an exemplary embodiment, the second brush 66 can either be mounted in a first position 84 (as illustrated in FIG. 1) or in a second position 86. A user action such as flipping a speed selection switch, turning a speed selection knob, etc. can cause the second brush 66 to move from the first position 84 to the second position 86 and vice versa. Alternatively, the second brush can be manually moved from one position to another. The first position 84 can correspond to a first portion of the commutator 68 and the second position 86 can correspond to a second portion of the commutator 68, where the first portion and the second portion are at least partially distinct. The first position 84 can be a first annular distance from the first brush 64 and the second position 86 can be a second annular distance from the first brush 64.

Mounting the second brush 66 in the first position 84 causes the second brush 66 to conduct current through the first portion of the commutator 68 and results in a first optimal operating mode for the electric motor 62. Mounting the second brush 66 in the second position 86 causes the second brush 66 to conduct current through the second portion of the commutator 68 and results in a second optimal operating mode for the electric motor 62. Alternatively, the second brush can be moved between more than two positions corresponding to more than two portions of the commutator such that more than two optimal operating modes can be provided. To ensure that a correct operational current is supplied to the electric motor 62, the controller 35 can detect a position of the second brush 66 and control operational current accordingly. Brush detection by the controller 35 is described in more detail with reference to FIGS. 2-5.

In alternative embodiments, the electric motor described with reference to FIG. 1 can be modified to operate in any way known to those skilled in the art. Further, the electric motor can include fewer or additional components, and the components can interact in any way capable of converting electrical energy into mechanical energy. For example, the one or more permanent magnets can be mounted to the armature instead of the stator and the stator, as opposed to the armature, can include the one or more current conducting coils. The brief description of the operation of an electric motor provided herein is meant to provide context only, and is not meant to be limiting in any way. The exemplary embodiments can be applied to any electric brush motor known to those skilled in the art.

Figure 2:
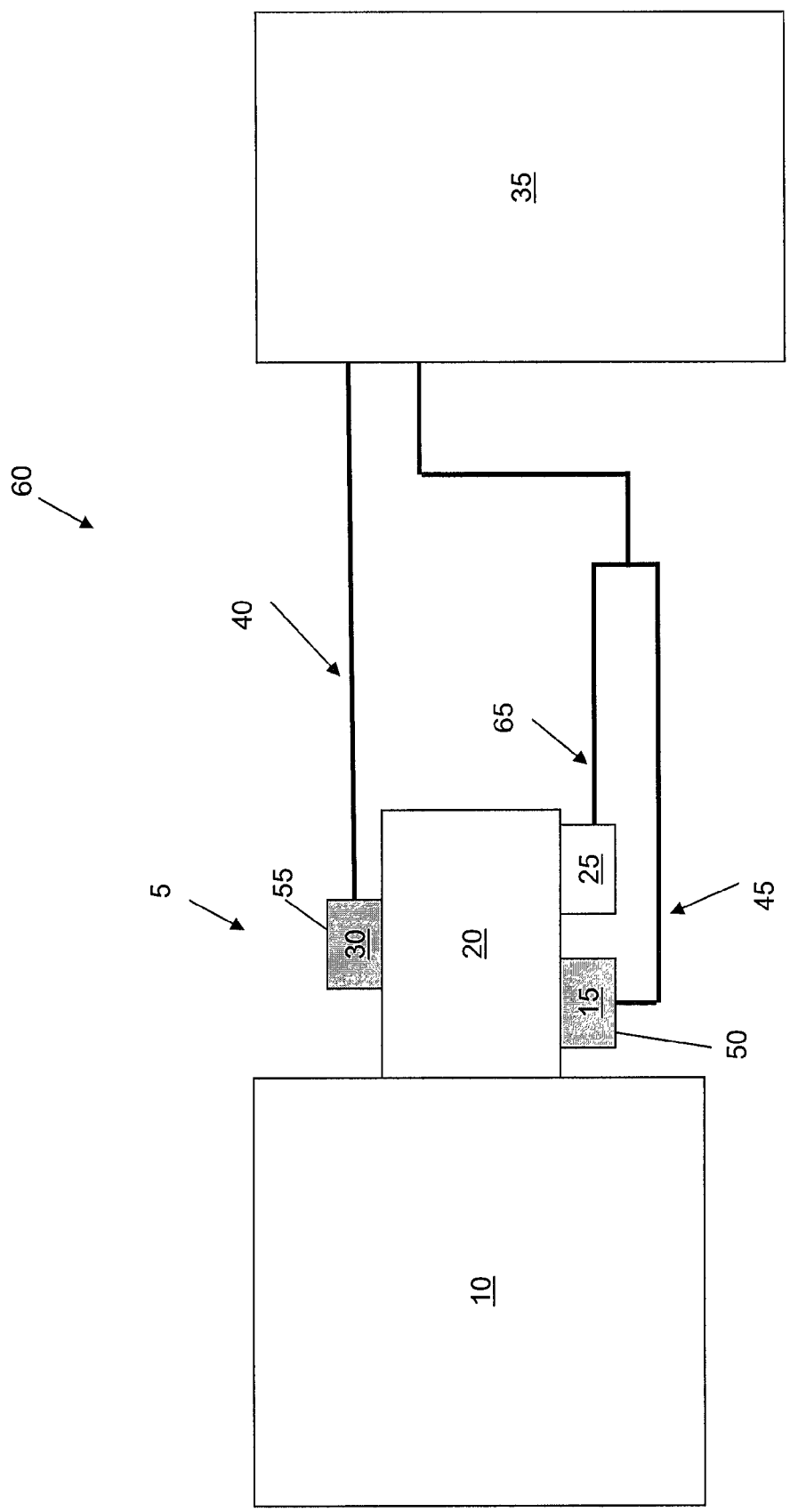
FIG. 2 is a block diagram illustrating an electric motor system in accordance with an exemplary embodiment.

FIG. 2 is a block diagram illustrating an electric motor system 60 including an electric motor 5 and a controller 35 for the electric motor 5. The electric motor 5 includes an armature 10, a commutator 20, a first brush 55, and a second brush 50. The second brush 50 is mounted in a first position 15 and is capable of being mounted in a second position 25. The first brush 55 is mounted in a third position 30. In an exemplary embodiment, the first brush 55 can be stationary relative to the commutator 20. The first brush 55 and the second brush 50 can be mounted in contact with the commutator 20 such that a current can be conducted through the commutator 20. In an alternative embodiment, the electric motor can include a third brush mounted in the second position such that only one of the second brush and the third brush is a current conducting brush at a given time. Such an embodiment is illustrated with reference to FIG. 3.

The controller 35 can include a conducting brush position detector that can be used to determine whether the second brush 50 is located in the first position 15 or the second position 25. Alternatively, the controller and conducting brush position detector can exist as separate elements. To determine a position of a conducting brush, the controller 35 can send a test signal to an input of the electric motor 5 via an input path 40. In an exemplary embodiment, the test signal can be generated by a power supply or pulse width modulation drive used to provide operational current to the electric motor 5. Alternatively, the test signal can be generated by a distinct test signal generator. The test signal can be a low duty cycle current pulse that is insufficient to operate the electric motor 5 (i.e., that is incapable of causing the armature 10 to rotate). For example, in an exemplary embodiment, a low duty cycle current pulse may have a duty cycle of 2% whereas a 6% duty cycle pulse may be needed to cause rotation of the motor. The duty cycle may vary dependent on the operating characteristics of the motor used. Thus, a 2% low duty cycle current pulse is not intended to be limiting, but merely exemplary.

The test signal can cause an output signal at a first output path 45 if the second brush 50 is located in the first position 15 or at a second output path 65 if the second brush 50 is located in the second position 25. From the output signal, a response can be measured. The value of the measured response can be used to determine the position in which the second brush 50 is located because the resistance from the input path 40 to the first output path 45 can differ relative to the resistance from the input path 40 to the second output path 65. As such, a response caused by a test signal can differ depending on whether the response comes from the first output path 45 or the second output path 65. This same process can be used to detect the position of a conducting brush in a configuration that includes a third brush, a fourth brush, a fifth brush, etc. In an alternative embodiment, the input and output paths described with reference to FIG. 1 can be reversed such that the first output path is a first input path, the second output path is a second input path, and the input path is an output path.

In an exemplary embodiment, the response can be a voltage determined across a known resistance. The controller 35 can determine the position of the second (or conducting) brush by comparing the measured response to a threshold response value. In an alternative embodiment, the controller can determine the position of the second (or conducting) brush by comparing a measured response to entries in a table or in a list of response values. Using the detected position of the second (or conducting) brush, the controller 35 can determine the optimal operating mode and supply the electric motor 5 with an appropriate operational current.

Figure 3:
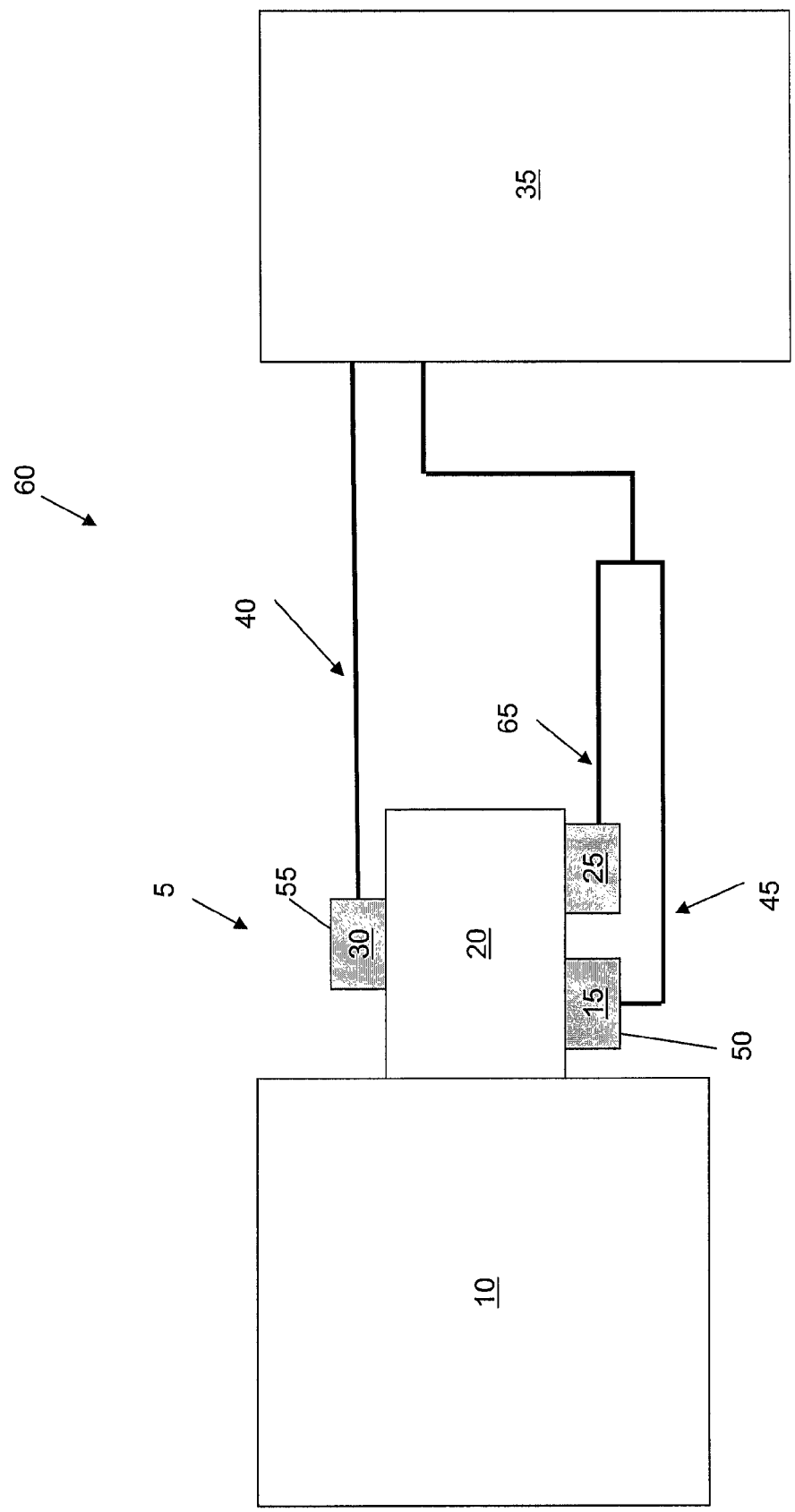
FIG. 3 is a block diagram illustrating a second electric motor system in accordance with an exemplary embodiment.

FIG. 3 is a block diagram illustrating an electric motor system 200 including an electric motor 205 and a controller 35 for the electric motor 205. The electric motor 205 includes a first brush 220, a second brush 210, and a third brush 225. The second brush 210 is mounted in a first position 215, the third brush 225 is mounted in a second position 230, and the first brush 220 is mounted in a third position 235. A switching circuit can be used to control which of the second brush 210 and the third brush 225 conduct current at a given time. Conducting current through the second brush 210 can facilitate a first optimal operating mode of the electric motor 205 and conducting current through the third brush 225 can facilitate a second optimal operating mode. The controller 35 can be used to detect which of the second brush 210 and the third brush 225 is conducting current at a given time.

The process for detecting the conducting brush can be similar to the detection process described with reference to FIG. 2. The controller 35 can send a test signal to an input of the electric motor 205 via an input path 240. The test signal can cause an output signal at a first output path 245 if the second brush 210 is conducting current or at a second output path 250 if the third brush 225 is conducting current. From the output signal, a response can be measured. The value of the measured response can be used to determine the position of the conducting brush because the resistance from the input path 240 to the first output path 245 can differ relative to the resistance from the input path 240 to the second output path 250. As such, a response caused by a test signal can differ depending on whether the response comes from the first output path 245 or the second output path 250. In alternative embodiments, the electric motor can include a fourth brush, a fifth brush, and so on.

Figure 4:
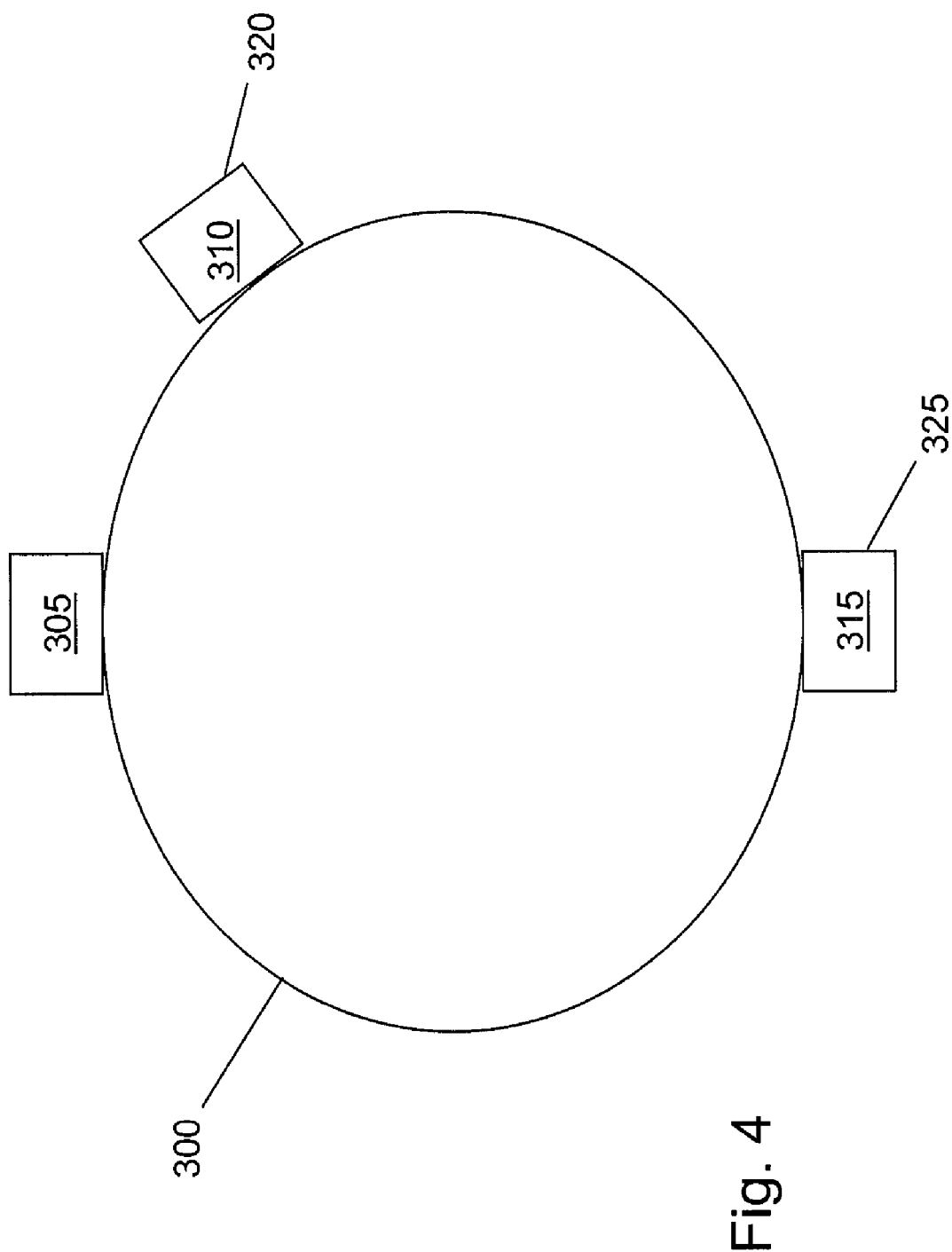
FIG. 4 is a schematic diagram of a commutator and brush configuration in accordance with an exemplary embodiment.

FIG. 4 is a schematic diagram of a commutator 300 and brush configuration according to an exemplary embodiment. A first brush 325 can be fixedly mounted in a third position 315. A second brush 320 is mounted in a second position 310 and is capable of being mounted in a first position 305. A controller (not shown) can be used to detect whether the second brush 320 is mounted in the first position 305 or the second position 310. The controller can be the controller described with reference to FIGS. 2, 3, and 5. The configuration illustrated in FIG. 4 is not meant to be limiting with respect to brush position. The exemplary embodiments can be used with any configuration of brushes in an electric brush motor as known to those skilled in the art.

Figure 5:
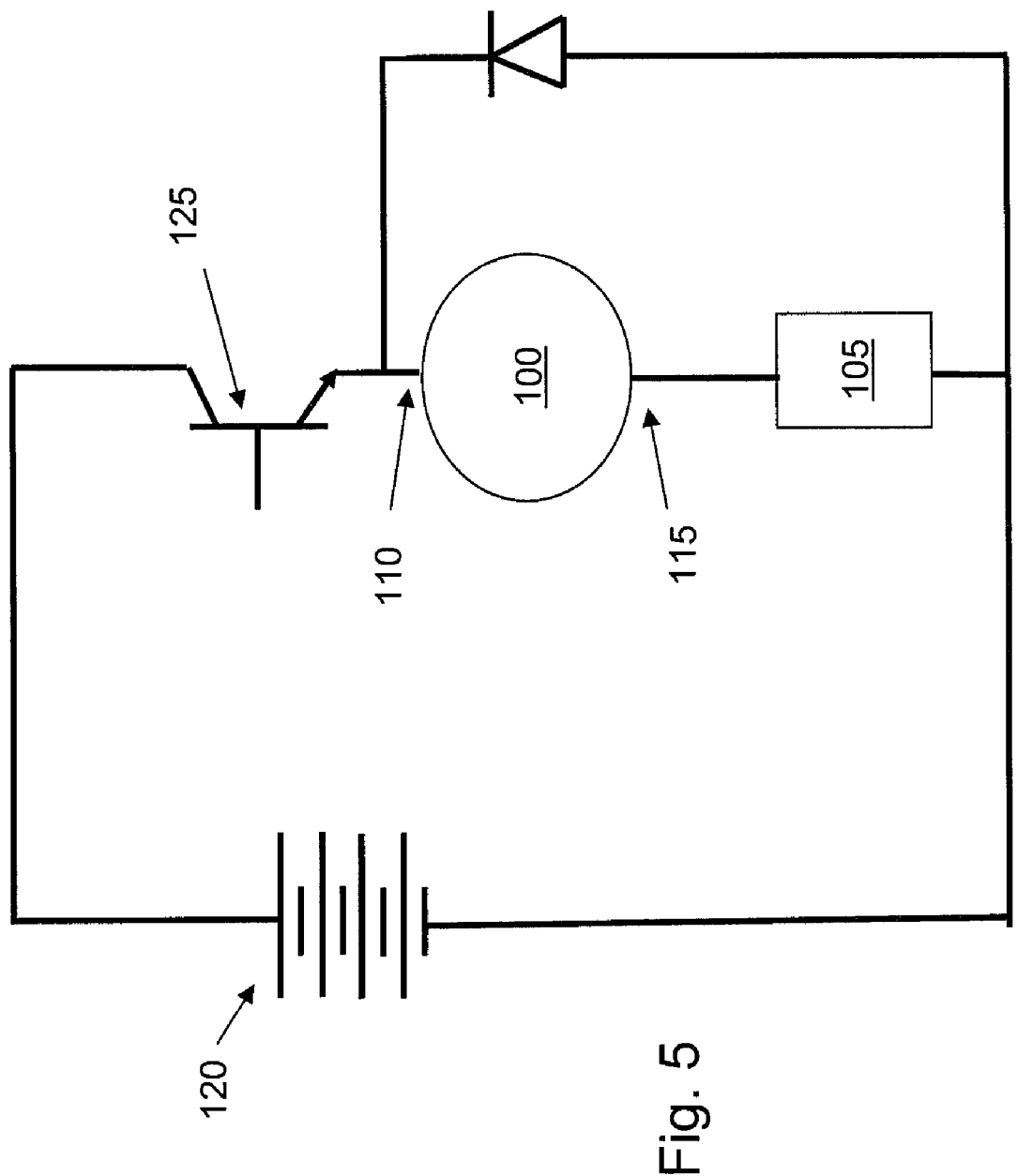
FIG. 5 is a circuit diagram illustrating a control circuit for detecting a conducting brush position and controlling an electric motor in accordance with an exemplary embodiment.

FIG. 5 illustrates a circuit diagram illustrating a control circuit for detecting a conducting brush position and for operating an electric motor 100. A power supply 120 can be used to supply current to a pulse width modulation drive 125. A controller can direct the pulse width modulation drive 125 to supply an appropriate current to the electric motor 100. In an exemplary embodiment, the pulse width modulation drive 125 can supply a low duty cycle test signal to the electric motor 100 and one or more high duty cycle operational currents to the electric motor 100. The low duty cycle test signal can be used to detect the position of a conducting brush within the electric motor 100. The one or more high duty operational currents can be one or more currents required to operate the electric motor 100 in one or more operating modes.

A test signal can be sent from the pulse width modulation drive 125 to an input 110 of the electric motor 100. In an exemplary embodiment, the test signal can be a low duty cycle current pulse insufficient to drive the electric motor 100. Alternatively, the test signal can be any electrical signal capable of being used to determine the position of a conducting brush. The input 110 can be to a first brush of the electric motor 100. Alternatively, the input can be to a second brush or other element capable of conducting a test signal. The test signal can flow from the input 110 through the electric motor 100 and to an output 115. In an exemplary embodiment, the output 115 can be a second brush of the electric motor 100. Alternatively, the output can be a first brush or other element capable of conducting the test signal. In an exemplary embodiment, the test signal can be sent during a startup period prior to actual operation of the electric motor 100. The startup period can be any period during which the control circuit is complete and the pulse width modulation drive 125 is capable of providing an electrical signal to the electric motor 100.

Using the output signal, a response can be measured. In an exemplary embodiment, the measured response can be a voltage value obtained by utilizing the output current at the output 115, a known resistance 105, and Ohm's law (Voltage=Current*Resistance). The output current can differ based on the position in which a conducting brush is located within the electric motor 100. If the conducting brush is in a first position, there can be a first resistance along the path from the input 110 to the output 115. The first resistance can cause a first voltage drop across the electric motor 100, resulting in a first response at the output 115. If the conducting brush is in a second position, there can be a second resistance along the path from the input 110 to the output 115. The second resistance can cause a second voltage drop across the electric motor 100, resulting in a second response at the output 115 that is different from the first response. In an exemplary embodiment, the position of a conducting brush can be determined by comparing the measured response to a threshold response value. Alternatively, a measured response can be compared to one or more response values in a table or list to determine the position of the conducting brush.

An operational current required by the electric motor 100 can depend on the determined position of a conducting brush within the electric motor 100. For example, a first position of a conducting brush can correspond to a low speed operating mode and a second position of the conducting brush can correspond to a high speed operating mode of the electric motor 100. If it is determined that a conducting brush is in the first position, operational current supplied to the electric motor 100 by the controller can be that required for low speed operation. If it is determined that the conducting brush is in the second position, operational current supplied to the electric motor 100 by the controller can be that required for high speed operation. The operational current required for low speed operation can differ from the operational current required for high speed operation.

The detecting and controlling processes of the control circuit can be embodied in a single controller. Alternatively, the detecting and controlling processes can be embodied as distinct elements. In one embodiment, the detecting and controlling processes can be embodied as executable computer-readable instructions in a computer-readable medium. The instructions can include sending a test signal to an input of an electric motor. A response to the test signal can be received based on an output of the electric motor. Based on the received response, a position of a brush that is capable of conducting current through a commutator of the electric motor can be determined. The electric motor can be supplied with a first current input if the brush is in a first position and a second current input if the brush is in a second position.

The foregoing description of exemplary embodiments have been presented for purposes of illustration and of description. It is not intended to be exhaustive or to limit the invention to the precise form disclosed, and modifications and variations are possible in light of the above teachings or may be acquired from practice. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for determining a current input to an electric motor, the method comprising:
    sending a test signal to an input of an electric motor;
    measuring a response to the test signal using an output of the electric motor;
    determining, based on the measured response, a position of a brush that is capable of conducting current through a commutator of the electric motor; and
    supplying the electric motor with a first current input if the brush is in a first position and a second current input if the brush is in a second position.

2. The method of claim 1, wherein the test signal is a current pulse.

3. The method of claim 2, wherein the current pulse is insufficient to operate the electric motor.

4. The method of claim 1, wherein the position of the brush is determined by comparing the measured response to a threshold response value.

5. The method of claim 1, wherein the position of the brush is determined by comparing the measured response to a plurality of response values.

6. The method of claim 1, wherein the response is a voltage measured over a known resistance.

7. A computer-readable medium having computer-readable instructions stored thereon that, upon execution by a processor, cause the processor to control an input to an electric motor, the instructions comprising:
    sending a test signal to an input of an electric motor;
    receiving a response to the test signal based on an output of the electric motor;
    determining, based on the received response, a position of a brush that is capable of conducting current through a commutator of the electric motor; and
    supplying the electric motor with a first current input if the brush is in a first position and a second current input if the brush is in a second position.

8. The computer-readable medium of claim 7, wherein the test signal is a current pulse.

9. The computer-readable medium of claim 8, wherein the current pulse is insufficient to operate the electric motor.

10. The computer-readable medium of claim 7, wherein the measured response is a voltage determined over a known resistance.

11. The computer-readable medium of claim 7, wherein the position of the brush is determined by comparing the response to a threshold response value.

12. The computer-readable medium of claim 7, wherein the position of the brush is determined by comparing the response to a plurality of response values.

13. An electric motor system, the electric motor system comprising:
    an electric motor comprising
        a commutator;
        a first brush mounted such that the first brush is capable of conducting current through the commutator; and
        a second brush mounted such that the second brush is capable of conducting current through the commutator; and
    a controller configured to
        send a test signal to the electric motor;
        measure a response to the test signal using an output of the electric motor; and
        determine, based on the measured response, a position of the second brush.

14. The electric motor system of claim 13, wherein the controller is further configured to supply a first input current to the electric motor if the second brush is mounted in a first position and a second input current to the electric motor if the second brush is mounted in a second position.

15. The electric motor system of claim 14, wherein the first position corresponds to a first operating mode of the electric motor and the second position corresponds to a second operating mode of the electric motor.

16. The electric motor system of claim 13, wherein the first brush is mounted such that the first brush is in contact with a first portion of the commutator and the second brush is mounted such that the second brush is in contact with a second portion of the commutator.

17. The electric motor system of claim 13, wherein the test signal is sent during a startup period.

18. The electric motor system of claim 13, wherein the controller further comprises a pulse width modulation drive capable of generating the test signal.

19. The electric motor system of claim 13, wherein the electric motor further comprises an armature capable of receiving an electrical signal from the commutator.

20. The electric motor system of claim 13, wherein the measured response is a voltage determined over a known resistance.

* * * * *